United States Patent
Sayre et al.

(10) Patent No.: US 10,006,530 B2
(45) Date of Patent: Jun. 26, 2018

(54) TORQUE CONVERTER WITH RIVET-BALANCED TURBINE AND METHOD THEREOF

(71) Applicant: Schaeffler Technologies AG & Co. KG, Herzogenaurach (DE)

(72) Inventors: Daniel Sayre, Copley, OH (US); Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 358 days.

(21) Appl. No.: 14/881,810

(22) Filed: Oct. 13, 2015

(65) Prior Publication Data
US 2017/0102061 A1 Apr. 13, 2017

(51) Int. Cl.
*F16H 45/02* (2006.01)
*F16H 41/28* (2006.01)

(52) U.S. Cl.
CPC .............. *F16H 45/02* (2013.01); *F16H 41/28* (2013.01); *F16H 2045/0205* (2013.01); *F16H 2045/0221* (2013.01); *F16H 2045/0278* (2013.01)

(58) Field of Classification Search
CPC ................................. F16H 41/28; F16H 45/02
USPC ........... 191/3.21; 192/3.3, 212; 60/338, 330, 60/363; 416/60
See application file for complete search history.

(56) References Cited

U.S. PATENT DOCUMENTS

| | | | | |
|---|---|---|---|---|
| 4,879,792 A * | 11/1989 | O'Connor | ............... | F01D 5/027 29/889 |
| 7,905,337 B2 * | 3/2011 | Degler | .................... | F16H 45/02 192/212 |
| 8,506,253 B2 * | 8/2013 | Lecuyer | ................... | F01D 5/027 416/145 |
| 8,763,775 B2 | 7/2014 | Vanni et al. | | |
| 8,839,925 B2 * | 9/2014 | Uchi | ....................... | F16H 45/02 192/205 |
| 9,360,058 B2 * | 6/2016 | Jameson | ................. | F16D 33/18 |
| 9,765,872 B2 * | 9/2017 | Werthman | ............. | F16H 45/02 |
| 2013/0230385 A1 * | 9/2013 | Lindemann | ............ | F16D 33/18 415/122.1 |
| 2014/0097055 A1 * | 4/2014 | Lindemann | ............ | F16H 41/24 192/3.21 |
| 2014/0238008 A1 * | 8/2014 | Nakashima | ............ | F16H 41/24 60/338 |
| 2015/0021135 A1 | 1/2015 | Jameson | | |

(Continued)

*Primary Examiner* — Michael Leslie
*Assistant Examiner* — Richard Drake (57) ABSTRACT

A torque converter, including: an axis of rotation; a cover arranged to receive torque; an impeller including a shell non-rotatably connected to the cover; a turbine in fluid communication with the impeller and including a turbine shell including a radially outermost segment including a radially outermost end of the turbine shell, at least one blade connected to the turbine shell and an entirety of which is located radially inward of the radially outermost segment; a vibration damper including at least one spring and at least one tab directly engaged with at least one circumferential end of the at least one spring and non-rotatably connected to the turbine shell; at least one rivet passing though the radially outermost segment and fixedly connected to the radially outermost segment; and a torque converter clutch arranged to transmit torque from the cover to the damper when the torque converter clutch is closed.

20 Claims, 6 Drawing Sheets

(56) References Cited

U.S. PATENT DOCUMENTS

2016/0195159 A1* 7/2016 Takikawa .............. F16F 15/145
  74/574.2
2017/0002908 A1* 1/2017 Saka ....................... F16H 45/02
2017/0030451 A1* 2/2017 Dinger .................. F16F 15/145

* cited by examiner

TORQUE CONVERTER WITH RIVET-BALANCED TURBINE AND METHOD THEREOF

TECHNICAL FIELD

The present invention relates generally to a torque converter with a turbine weight-balanced using one or more rivets fixed to the turbine shell at a radially outermost segment of the turbine shell and a method of fabricating a torque converter including weight balancing the turbine with one or more rivets.

BACKGROUND

Turbines for known torque converters are typically weight balanced to ensure smooth rotation of the turbine when the torque converter is in use. It is known to remove material from the turbine shell or to weld weights to the turbine shell to provide the weight balancing. However, removing material can result in material chips lodging in portions of the torque converter, for example in friction material for clutches, which degrades performance of the torque converter and can cause damage to components of the torque converter. Similarly, welding can cause splatter which can lodge in portions of the torque converter degrading performance of or damaging the torque converter. Further, enabling access to the turbine shell to remove material or add weights can constrain the configuration of components in the torque converter, undesirably limiting configuration options or increasing dimensions of the torque converter.

SUMMARY

According to aspects illustrated herein, there is provided a torque converter, including: an axis of rotation; a cover arranged to receive torque; an impeller including a shell non-rotatably connected to the cover; a turbine in fluid communication with the impeller and including a turbine shell including a radially outermost segment including a radially outermost end of the turbine shell, at least one blade connected to the turbine shell and an entirety of which is located radially inward of the radially outermost segment; a vibration damper including at least one spring and at least one tab directly engaged with at least one circumferential end of the at least one spring and non-rotatably connected to the turbine shell; at least one rivet passing though the radially outermost segment and fixedly connected to the radially outermost segment;
and a torque converter clutch arranged to transmit torque from the cover to the damper when the torque converter clutch is closed.

According to aspects illustrated herein, there is also provided a torque converter, including: an axis of rotation; a cover arranged to receive torque; an impeller including a shell non-rotatably connected to the cover; a turbine in fluid communication with the impeller and including a turbine shell including a radially outermost segment including a radially outermost end of the turbine shell and at least one blade connected to the turbine shell and an entirety of which is located radially inward of the radially outermost segment; a plurality of openings passing through the radially outermost segment; a vibration damper including at least one spring and at least one tab directly engaged with at least one circumferential end of the at least one spring and non-rotatably connected to the turbine shell at at least one point aligned with the at least one blade in a direction parallel to the axis of rotation such that a line parallel to the axis of rotation passes through the at least one point and the at least one blade; and at least one rivet passing through and fixedly connected to the radially outermost segment.

According to aspects illustrated herein, there is also provided a method of fabricating a torque converter, including: fixedly connecting at least one blade to a turbine shell; connecting a vibration damper to the turbine shell; spinning the turbine shell; detecting an imbalance in the turbine shell; and fixedly connecting at least one rivet to a segment of the turbine shell radially outward of the at least one blade to balance the turbine shell.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" components we mean: any time one of the components rotates, all of the components rotate; and relative rotation between the components is not possible. Axial or radial displacement between components is possible, but not required.

Figure 1:
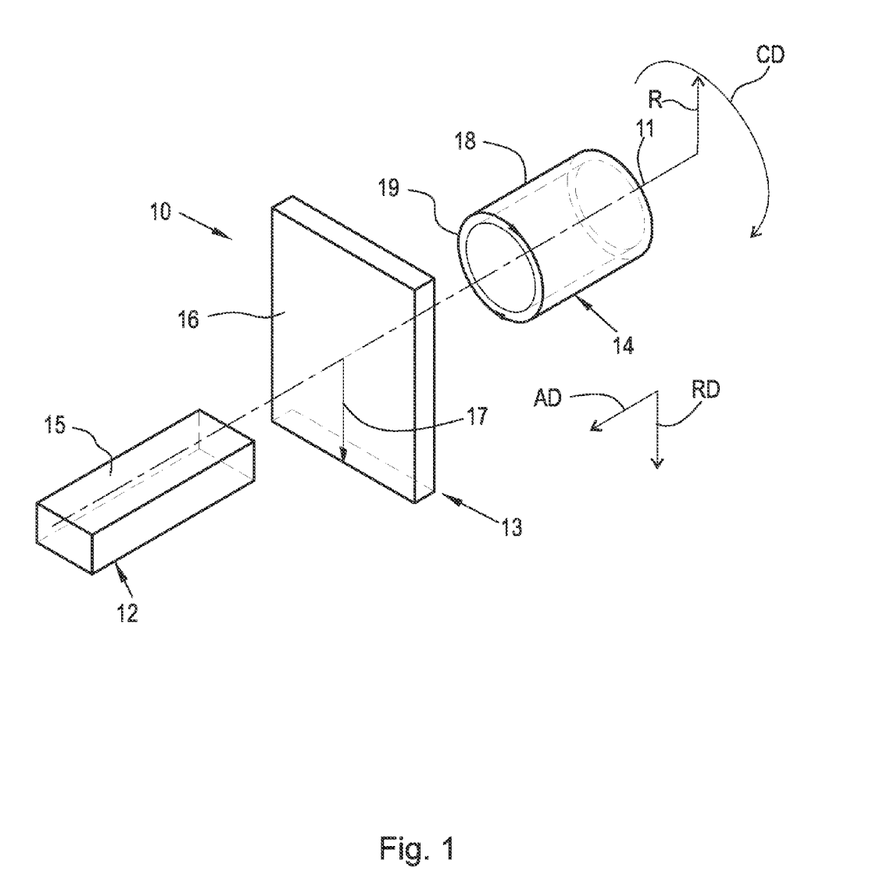
FIG. 1 is a perspective view of a cylindrical coordinate system demonstrating spatial terminology used in the present patent.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
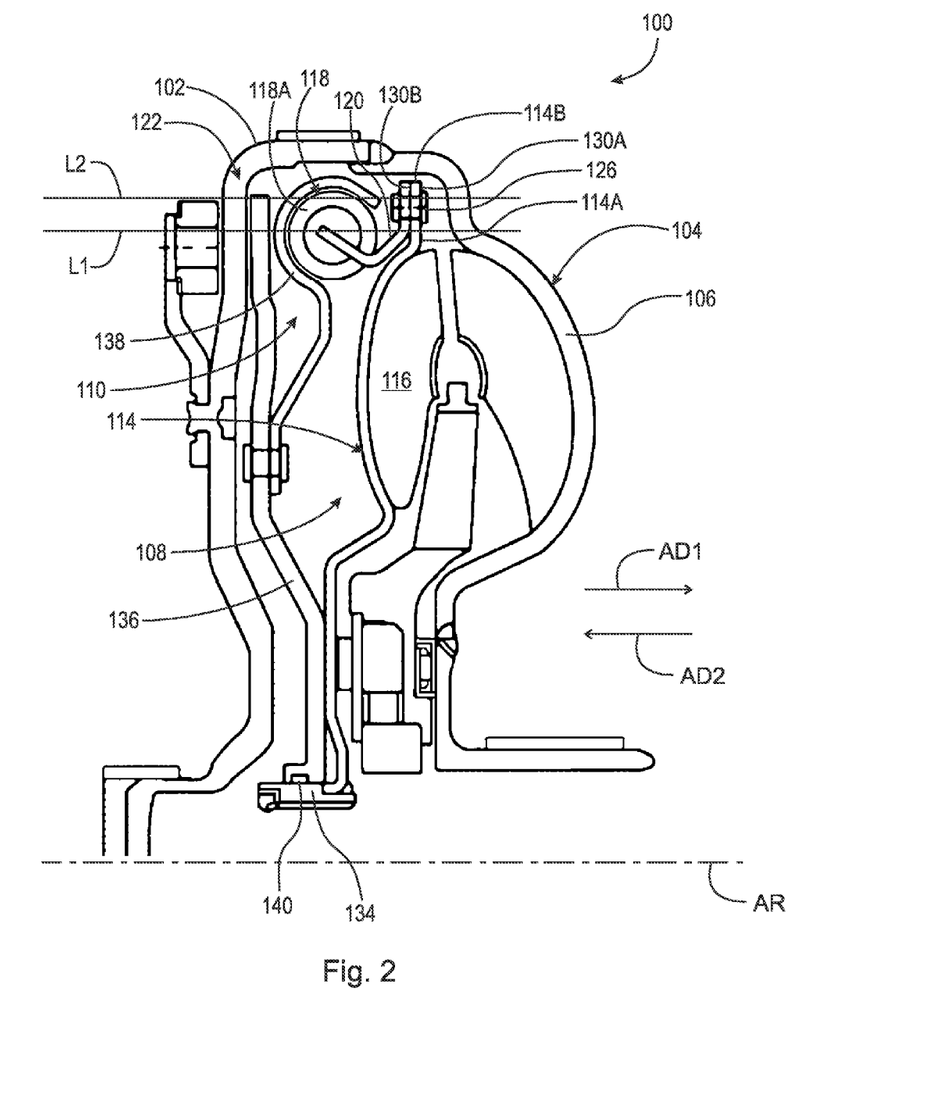
FIG. 2 is a partial cross-sectional view of a torque converter with at least one rivet for turbine balancing.

FIG. 2 is a partial cross-sectional view of torque converter 100 with at least one rivet for turbine balancing.

Figure 3:
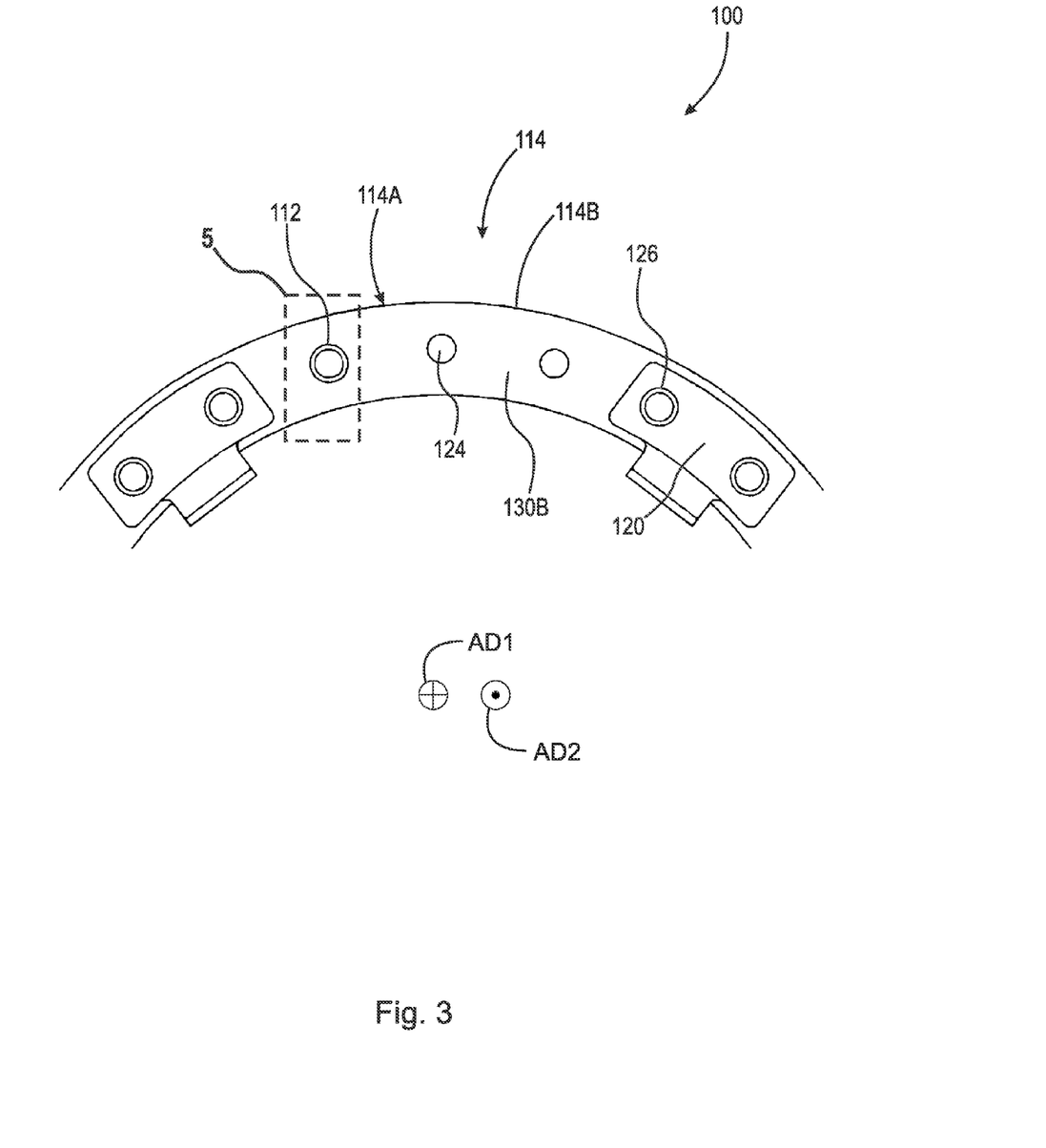
FIG. 3 is a detail of the radially outermost segment of the turbine shown in FIG. 2.

FIG. 3 is a detail of the outer portion of the turbine in FIG. 2. Torque converter 100 includes: axis of rotation AR; cover 102 arranged to receive torque; impeller 104 including shell 106 non-rotatably connected to cover 102; turbine 108; vibration damper 110; and at least one rivet 112. Turbine 108 is in fluid communication with impeller 104 and includes: turbine shell 114 including radially outermost segment 114A including radially outermost end 114B of the turbine shell; and at least one blade 116. At least one blade 116 is connected to turbine shell 114 and an entirety of at least one blade 116 is located radially inward of radially outermost segment 114A. Vibration damper 110 includes: at least one spring 118; and at least one tab 120 directly engaged with at least one circumferential end 118A of at least one spring 118 and non-rotatably connected to turbine shell 114. Unless stated otherwise, the discussion that follows is directed to a single rivet 112; however, it should be understood that torque converter 100 can include more than one rivet 112.

Rivet 112 passes though radially outermost segment 114A and is fixedly connected to radially outermost segment 114A. Torque converter 100 includes torque converter clutch 122 arranged to transmit torque from cover 102 to damper 110 when torque converter clutch 122 is closed. Rivet 112 is arranged to weight balance turbine 108 for rotation of turbine 108. Rivet 112 does not pass through a tab 120. That is, rivet 112 is not used to fix a tab 120 to the turbine shell. No line, such as line L1, parallel to axis of rotation AR, passes through at least one blade 116 and radially outermost segment 114A. No line, such as line L2, parallel to axis of rotation AR, passes through rivet 112 and through at least one blade 116.

Radially outermost segment 114A includes openings 124 passing through radially outermost segment 114A. Rivets 126 pass through openings 124 to fix tabs 120 to segment 114A. Rivet 112 is disposed in an opening 124 not used for a tab 120. Thus, there is a total number of openings 124, there is a total number of rivets 112, and the total number of rivets 112 is less than the total number of openings 124. Stated otherwise, some of openings 124 are used to rivet tabs 120 to segment 114A and one or more other openings 124 are used for rivet(s) 112 to weight balance turbine 108. In an example embodiment, every rivet passing through segment 114A is used to fix a tab 120 to segment 114A or is used to weight balance turbine 108.

Figure 4:
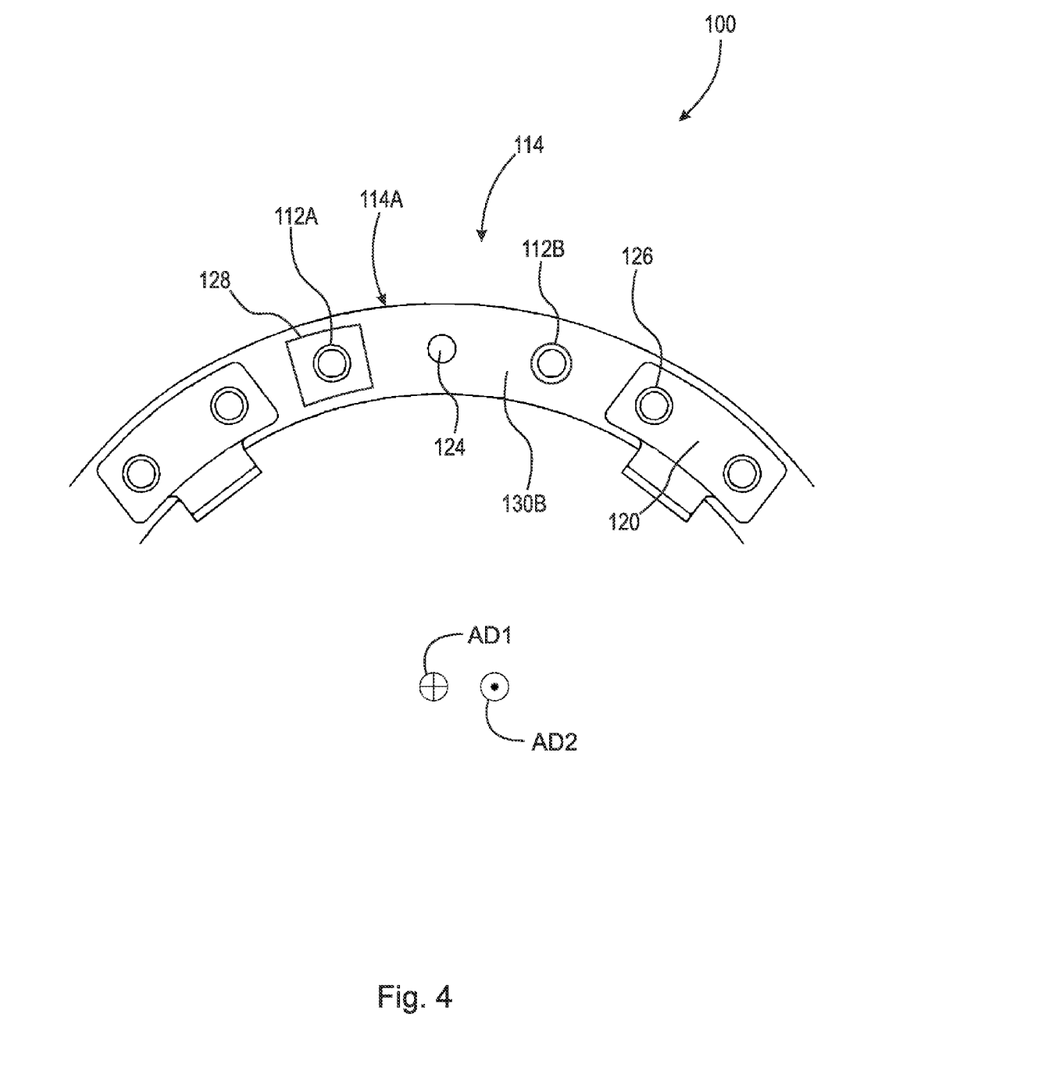
FIG. 4 is a detail of the radially outermost segment of the turbine shown in FIG. 2 with a weight component.

FIG. 4 is a detail of radially outermost segment 114A of turbine 108 shown in FIG. 2 with a weight component. In an example embodiment, torque converter 100 includes weight component 128 separate from turbine shell 114 and from tabs 120. One or more rivets 112, for example, rivet 112A, is used to non-rotatably connect weight component 128 to segment 114A. Component 128 and rivet 112A connecting component 128 to segment 114A are used to weight balance turbine 108. In an example embodiment, torque converter 100 includes rivet 112B fixedly connected to segment 114A and not passing through a component 128 or a tab 120. Rivet 112B also is used to weight balance turbine 108. It should be understood that more than one component 128 can be attached to segment 114A and more than one rivet 112 can be used to attach a component 128 to segment 114A.

Figure 5:
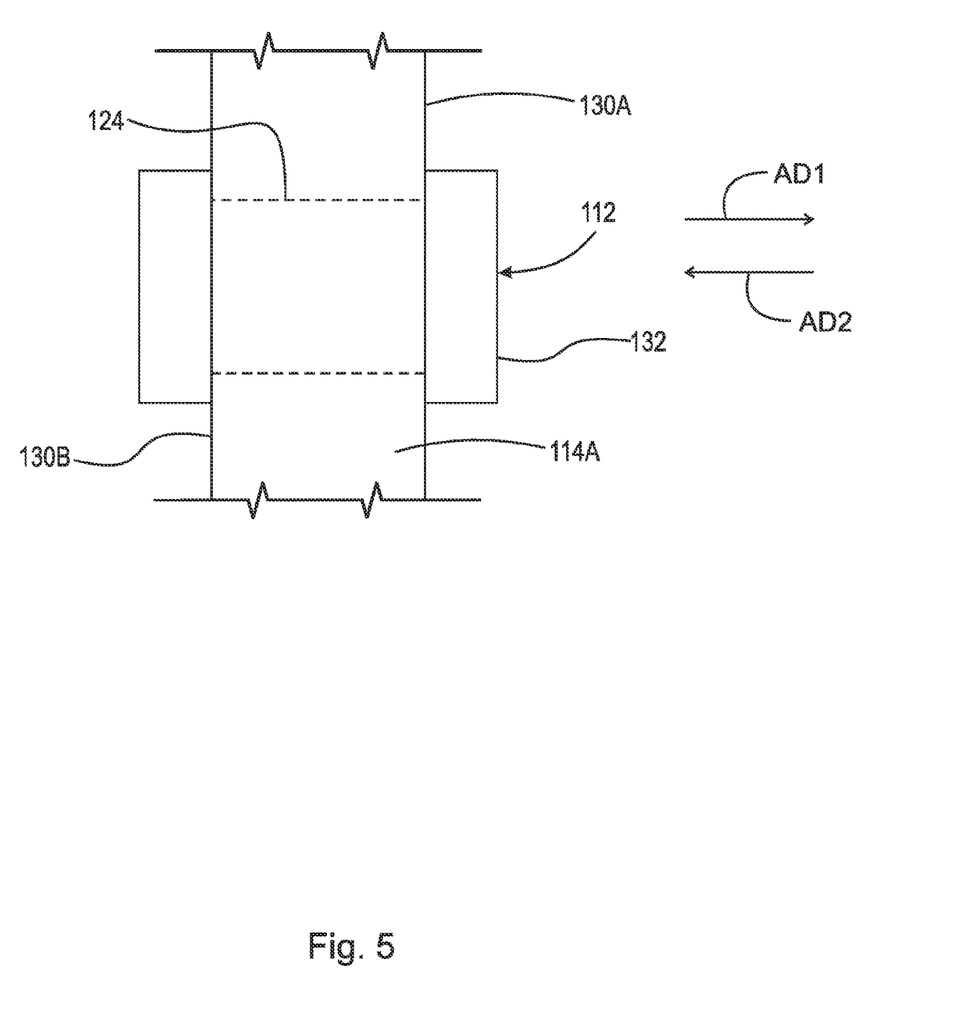
FIG. 5 is a plan view of area 5 in FIG. 3.

FIG. 5 is a plan view of area 5 in FIG. 3. Segment 114A includes: side 130A facing in axial direction AD1 toward impeller shell 106; and side 130B facing in axial direction AD2, opposite direction AD1. In an example embodiment, portion 132 of rivet 112 extends past side 130A in axial direction AD1. In an example embodiment, torque converter 100 is free of friction material disposed between side 130A and impeller shell 106 in axial direction AD1 or AD2. That is, segment 114A does not form a portion of a turbine clutch and is not arranged to frictionally engage with cover 106.

In an example embodiment: torque converter 100 includes output hub 134 non-rotatably connected to turbine shell 114 and arranged to non-rotatably connect to an input shaft (not shown) for a transmission; torque converter clutch 122 includes piston 136 displaceable in axial direction AD2 to non-rotatably connect piston 136 and cover 102; and vibration damper 110 includes drive plate 138 non-rotatably connected to piston 136 and engaged with at least one spring 118. Piston 136 is rotatable with respect to output hub 134 and is sealed against hub 134 with seal element 140. When clutch 122 is closed, torque from cover 102 is transmitted to hub 134 via plate 138, at least one spring 118, at least one tab 120 and shell 114.

Figure 6:
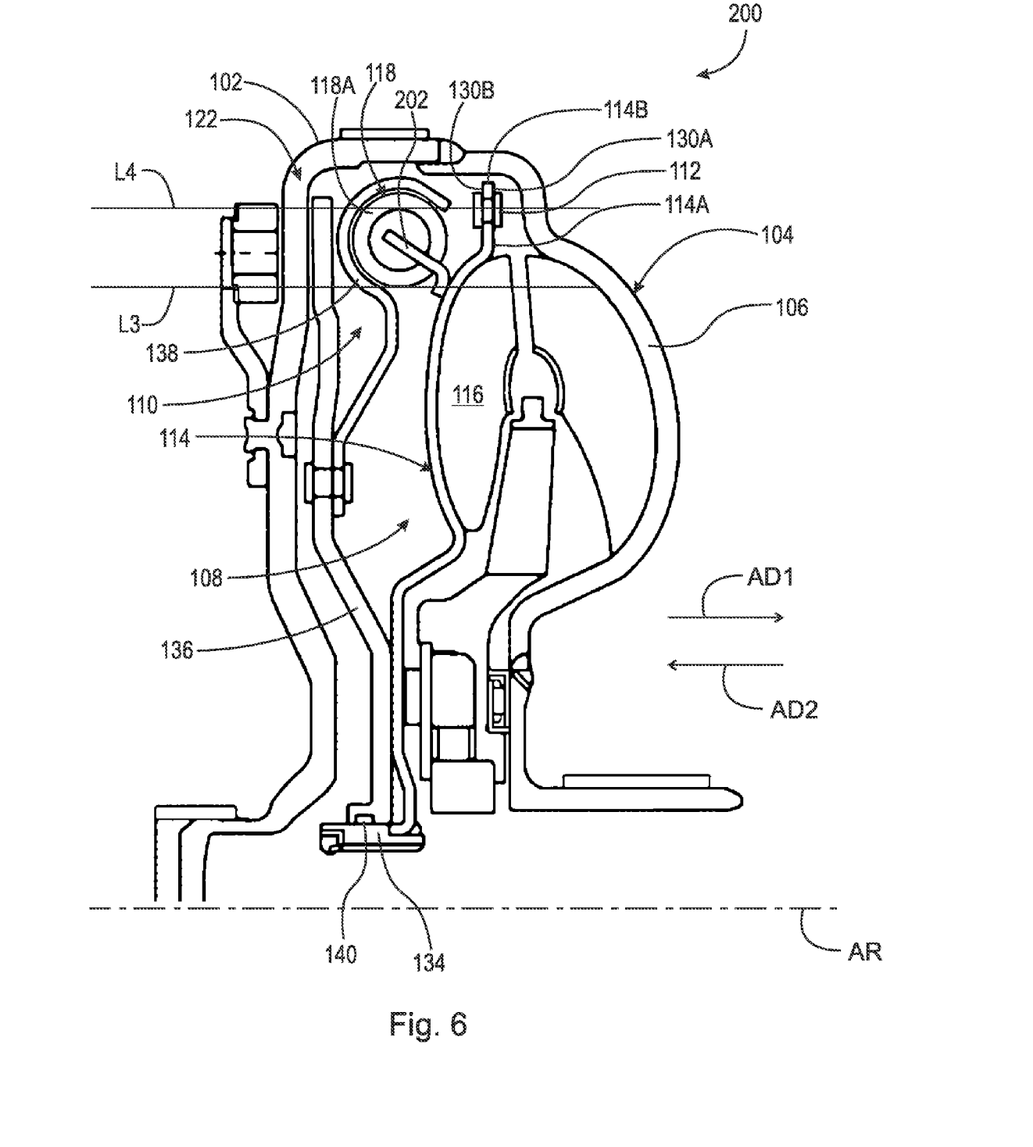
FIG. 6 is a partial cross-sectional view of a torque converter with at least one rivet for turbine balancing.

FIG. 6 is a partial cross-sectional view of torque converter 200 with at least one rivet for turbine balancing. The discussion for torque converter 100 is applicable to torque converter 200 except as noted. For torque converter 200, at least one tab 202 is engaged with at least one spring 118, but rather than being riveted to segment 114A with rivets 126, at least one tab 202 is fixed to shell 114 radially inward of segment 114A by any means known in the art, for example welding. At least one rivet 112 is used to weight balance turbine 108 as described above. Line L3, parallel to axis of rotation AR, passes through at least one blade 116 and tab 202. No line, such as line L4, parallel to axis or rotation AR, passes through at least one rivet 112 and passes through at least one blade 116 and tab 202.

The following should be viewed in light of FIGS. 2 through 6. The following describes a method for fabricating a torque converter. Although the method is presented as a sequence of steps for clarity, no order should be inferred from the sequence unless explicitly stated. A first step fixedly connects at least one blade to a turbine shell. A second step connects a vibration damper to the turbine shell. A third step spins the turbine shell. A fourth step detects an imbalance in the turbine shell. A fifth step fixedly connects at least one first rivet to a segment of the turbine shell radially outward of the at least one blade to balance the turbine shell.

A sixth step connects a piston for a torque converter clutch to the vibration damper: prior to connecting the vibration damper to the turbine shell; or after connecting the vibration damper to the turbine shell. A seventh step axially stacks the piston and vibration damper onto a stator and an impeller.

In an example embodiment, connecting the vibration damper to the turbine shell includes fixedly connecting a tab engaged with a spring for the vibration damper to the radially outermost segment with at least one second rivet. In an example embodiment, connecting the vibration damper to the turbine shell includes fixedly connecting a tab engaged with a spring for the vibration damper to the turbine shell radially inward of the radially outermost segment.

In an example embodiment, an eighth step fixedly connects, with the at least one first rivet, a weight component, separate from the turbine shell and the at least one tab, to the segment of the turbine shell to balance the turbine shell.

Although particular numbers and configurations of components are shown in FIGS. 2 through 6, it should be understood that torque converters 100 and 200 are not necessarily limited to the numbers and configuration of components shown. For example, torque converters 100 and 200 are not limited to a particular number of rivets 112, tabs 120 or 202, or openings 126. Advantageously, the number of tabs 120 or 202 and the number and spacing of openings 124 can be determined according to the requirements of specific torque converters 100 and 200. For example, the number and spacing of openings 124 can be determined to accommodate the required number and spacing of tabs 120, while leaving sufficient openings 124 for balancing purposes. The number and spacing of openings 124 can be determined on a case-by-case basis for torque converters 100 and 200, or can be made generic for a range of designs for torque converters 100 and 200. The number, size, configuration and spacing of optional weight components 128 can be determined as needed.

Advantageously, torque converters 100 and 200, in particular, rivet(s) 112 and optional weight components 128, eliminate the problems noted above regarding weight balancing of turbine 108. For example, neither welding nor material removal is used to weight balance turbine 108, eliminating the problems associated with weld splatter or material chips. Further, since rivet(s) 112 are fixed to shell 114 at the radially outermost segment of the shell (segment 114A), greater access to the turbine for weight balancing during fabrication of the torque converter is enabled.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
an axis of rotation;
a cover arranged to receive torque;
an impeller including a shell non-rotatably connected to the cover;
a turbine in fluid communication with the impeller and including:
a turbine shell including a radially outermost segment including a radially outermost end of the turbine shell;
at least one blade:
connected to the turbine shell; and,
an entirety of which is located radially inward of the radially outermost segment;
a vibration damper including:
at least one spring; and,
at least one tab directly engaged with at least one circumferential end of the at least one spring and non-rotatably connected to the turbine shell; and,
at least one rivet passing though the radially outermost segment and fixedly connected to the radially outermost segment, wherein no rivet included in the at least one rivet passes through a tab included in the at least one tab.

2. The torque converter of claim 1, wherein the at least one rivet is arranged to weight balance the turbine for rotation of the turbine.

3. The torque converter of claim 1, wherein no line parallel to the axis of rotation passes through the at least one blade and the radially outermost segment.

4. The torque converter of claim 1, wherein no line parallel to the axis of rotation passes through the at least one blade and the at least one rivet.

5. The torque converter of claim 1, further comprising:
a plurality of openings passing through the radially outermost segment, wherein:
the plurality of openings consists of a first number of openings;
the at least one rivet consists of a second number of rivets;
and,
the first number is greater than the second number.

6. The torque converter of claim 1, further comprising:
a plurality of openings passing through the radially outermost segment; and,
a first plurality of rivets fixedly connecting the at least one tab to the radially outermost segment, wherein:
each rivet included in the first plurality of rivets passes through:
a respective first opening included in the plurality of openings; and,
a respective tab included in the at least one tab; and,
the at least one rivet passes through a respective second opening, different from any respective first opening.

7. The torque converter of claim 1, wherein:
the at least one tab is fixedly connected to the turbine shell at a portion of the turbine shell; and,
a line parallel to the axis of rotation passes through the portion of the turbine shell and the at least one blade.

8. The torque converter of claim 1, further comprising:
a weight component separate from the turbine shell and from the at least one tab, wherein:
the at least one rivet includes a first rivet and a second rivet; and,
only one of the first rivet or the second rivet fixedly connects the weight component to the radially outermost segment.

9. The torque converter of claim 1, further comprising:
a weight component separate from the turbine shell and the at least one tab and arranged to weight balance the turbine for rotation of the turbine, wherein the at least one rivet fixedly connects the weight component to the radially outermost segment.

10. The torque converter of claim 1 wherein:
the radially outermost segment includes:
a first side facing in a first axial direction toward the impeller shell; and,
a second side facing in a second axial direction, opposite the first axial direction; and, a portion of the at least one rivet extends past the first side in the first axial direction.

11. The torque converter of claim 1 wherein:
the radially outermost segment includes:
a first side facing in a first axial direction toward the impeller shell; and,
a second side facing in a second axial direction, opposite the first axial direction; and,
the torque converter is free of friction material disposed between the first side and impeller shell in the first axial direction.

12. The torque converter of claim 1, further comprising a torque converter clutch arranged to transmit torque from the cover to the vibration damper when the torque converter clutch is closed.

13. The torque converter of claim 12, wherein the torque converter clutch includes a piston displaceable in an axial direction to non-rotatably connect the piston and the cover, the torque converter further comprising:
an output hub non-rotatably connected to the turbine shell and arranged to non-rotatably connect to an input shaft for a transmission, wherein:
the piston is rotatable with respect to the output hub; and,
the vibration damper includes a drive plate non-rotatably connected to the piston and engaged with the at least one spring.

14. A torque converter, comprising:
an axis of rotation;
a cover arranged to receive torque;
an impeller including a shell non-rotatably connected to the cover;
a turbine in fluid communication with the impeller and including:
a turbine shell including a radially outermost segment including:
a radially outermost end of the turbine shell; and,
a plurality of openings;
at least one blade:
connected to the turbine shell; and,
an entirety of which is located radially inward of the radially outermost segment;
a plurality of openings passing through the radially outermost segment;
a vibration damper including:
at least one spring; and,
at least one tab directly engaged with at least one circumferential end of the at least one spring and non-rotatably connected to the turbine shell at at least one point; and,
at least one rivet:
passing through at least one opening included in the plurality of openings; and,
fixedly connected to the radially outermost segment, wherein a line parallel to the axis of rotation passes through the at least one point and the at least one blade.

15. The torque converter of claim 14, wherein no line parallel to the axis of rotation passes through the at least one blade and the at least one rivet.

16. The torque converter of claim 14, wherein:
the plurality of openings includes a first number of openings;
the at least one rivet includes a second number of rivets; and,
the first number is greater than the second number.

17. A method of fabricating a torque converter, comprising:
fixedly connecting at least one blade to a turbine shell;
connecting at least one tab, included in a vibration damper, to the turbine shell;
engaging the at least one tab with at least one spring for the vibration damper;
spinning the turbine shell;
detecting an imbalance in the turbine shell; and,
fixedly connecting at least one rivet to a segment of the turbine shell radially outward of the at least one blade, without passing any rivet included in the at least one rivet through any tab included in the at least one tab, to balance the turbine shell.

18. The method of claim 17, further comprising:
connecting a piston for a torque converter clutch to the vibration damper:
prior to connecting the vibration damper to the turbine shell; or,
after connecting the vibration damper to the turbine shell.

19. The method of claim 18, further comprising:
axially stacking the piston and the vibration damper onto a stator and an impeller.

20. The method of claim 17, further comprising:
fixedly connecting, with the at least one rivet, a weight component, separate from the turbine shell and the at least one tab, to the segment of the turbine shell to balance the turbine shell.

* * * * *